US012537657B2

(12) United States Patent
Abotabl et al.

(10) Patent No.: US 12,537,657 B2
(45) Date of Patent: Jan. 27, 2026

(54) DYNAMIC PHYSICAL (PHY) LAYER RESOURCE REALLOCATION INDICATION FOR WIRELESS COMMUNICATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Marwen Zorgui, San Diego, CA (US); Krishna Kiran Mukkavilli, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 683 days.

(21) Appl. No.: 18/057,846

(22) Filed: Nov. 22, 2022

(65) Prior Publication Data

US 2024/0171363 A1   May 23, 2024

(51) Int. Cl.
*H04L 5/00* (2006.01)
*H04W 72/12* (2023.01)
*H04W 72/23* (2023.01)

(52) U.S. Cl.
CPC .......... *H04L 5/0096* (2013.01); *H04L 5/0094* (2013.01); *H04W 72/23* (2023.01)

(58) Field of Classification Search
CPC ..... H04L 5/0096; H04L 5/0094; H04W 72/23
See application file for complete search history.

(56) References Cited

U.S. PATENT DOCUMENTS

| 2020/0351897 A1 | 11/2020 | Fakoorian et al. |
| 2020/0367278 A1 | 11/2020 | Hosseini et al. |
| 2022/0353887 A1 | 11/2022 | Xu et al. |

FOREIGN PATENT DOCUMENTS

WO    WO-2023246745 A1 * 12/2023 ............ H04W 72/40

OTHER PUBLICATIONS

International Search Report and Written Opinion—PCT/US2023/077288—ISA/EPO—Feb. 7, 2024.
ZTE: "UL Inter—UE Multiplexing Between eMBB and URLLC", 3GPP TSG RAN WG1 #98bis, R1-1910104, 3rd Generation Partnership Project, Mobile Competence Centre, 650, Route Des Lucioles, F-06921 Sophia-Antipolis Cedex, vol. RAN WG1, No. Chongqing, China, Oct. 14, 2019-Oct. 20, 2019, Oct. 8, 2019, 13 Pages, XP051788911, Sections 2.1, 2.5-2.6.

* cited by examiner

*Primary Examiner* — Melvin C Marcelo
(74) *Attorney, Agent, or Firm* — QUALCOMM Incorporated

(57) ABSTRACT

This disclosure provides systems, methods, and devices for wireless communication that support reallocation of physical (PHY) layer resources allocated for wireless communication. In a first aspect, a method of wireless communication performed by a user equipment (UE) includes receiving, from a network, downlink control information (DCI) for reallocating one or more resources allocated to communications for the UE. The DCI includes at least one reallocation indicator that indicates reallocation of one or more PHY layer resources allocated to the UE. The method also includes performing a responsive action based on the at least one reallocation indicator. Other aspects and features are also claimed and described.

30 Claims, 7 Drawing Sheets

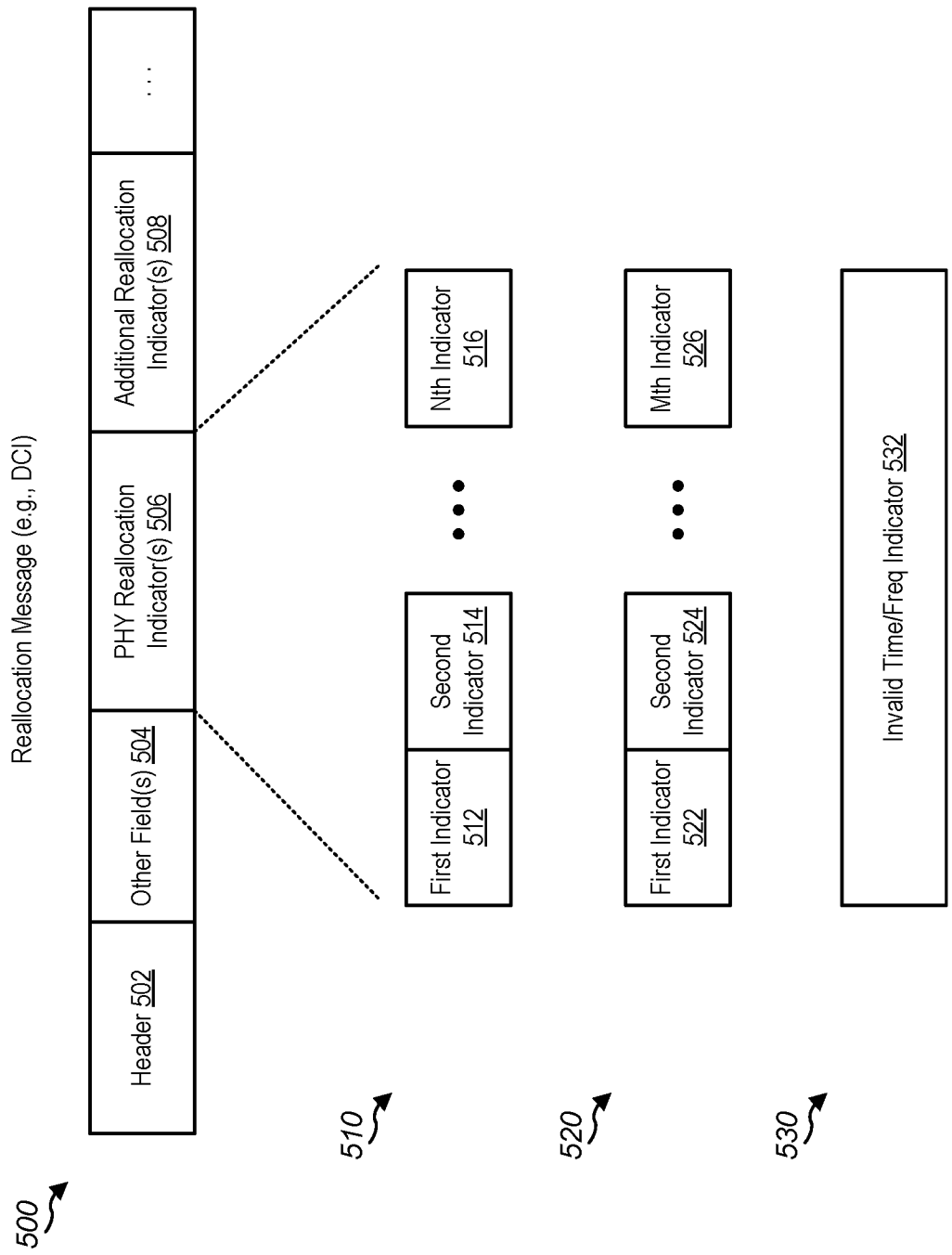

DYNAMIC PHYSICAL (PHY) LAYER RESOURCE REALLOCATION INDICATION FOR WIRELESS COMMUNICATION

TECHNICAL FIELD

Aspects of the present disclosure relate generally to wireless communication systems, and more particularly, to reallocation of physical (PHY) layer resources allocated for wireless communication. Some features may enable and provide improved communications, including reduced overhead to reallocate PHY layer resources in order to support higher priority communication traffic with stricter quality of service requirements.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

A base station typically manages and schedules wireless communication between itself and UEs within a wireless network to satisfy as many criteria as possible, such as signal strength criteria, bandwidth and latency criteria, power consumption criteria, and the like. In scheduling communications, the base station may allocate particular time and frequency resources to downlink (DL) communications from the base station to one or more UEs or to uplink (UL) communications from one or more UEs to the base station by issuing DL grants or UL grants to various UEs. For example, a DL grant may indicate time and frequency resources that are allocated to DL data transmission from the base station to a particular UE, and a UL grant may indicate time and frequency resources that are allocated to UL data transmission from a particular UE to the base station. These time and frequency resources are allocated in advance in order to allow receipt of the respective grants by the UEs for determining whether they are assigned to perform wireless communications via the allocated time and frequency resources or whether they should refrain from performing wireless communications via the allocated time and frequency resources.

Managing wireless communications becomes more challenging in a wireless network that supports different priority communications (e.g., traffic). For example, ultra-reliable low latency communications (URLLC) have more stringent quality of service (QoS) requirements than typical wireless communications, such as end-to-end latencies as low as 5 milliseconds (ms), which may require prioritizing URLLC traffic above other types of traffic within the wireless network. To that end, some wireless communication standards have introduced techniques for DL pre-emption and UL cancellation to enable base stations to reallocate previously allocated time and frequency resources for lower priority traffic to higher priority traffic such as URLLC traffic. For example, a base station may send a DL pre-emption message to a UE to indicate that time and frequency resources allocated to DL data transmission to the UE has been reallocated and the UE should not expect to receive data via the reallocated resources. As another example, a base station may send a UL cancellation message to a UE to indicate that time and frequency resources allocated to UL transmissions by the UE have been reallocated and the UE should not perform UL communications via the reallocated resources. Although the reallocation of time and frequency resources to serve URLLC traffic may satisfy the URLLC constraints, the time and frequency resources may be more than is needed to satisfy the URLLC constraints, resulting in less efficient use of the wireless spectrum and degradation in performance of the UEs that do not utilize URLLC.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a user equipment (UE) includes a memory storing processor-readable code and at least one processor coupled to the memory. The at least one processor is configured to execute the processor-readable code to cause the at least one processor to receive, from a network, downlink control information (DCI) for reallocating one or more resources allocated to communications for the UE. The DCI includes at least one reallocation indicator that indicates reallocation of one or more physical (PHY) layer resources allocated to the UE. The at least one processor is also configured to execute the processor-readable code to cause the at least one processor to perform a responsive action based on the at least one reallocation indicator.

In an additional aspect of the disclosure, a method for wireless communication performed by a UE includes receiving, from a network, DCI for reallocating one or more resources allocated to communications for the UE. The DCI includes at least one reallocation indicator that indicates reallocation of one or more PHY layer resources allocated to the UE. The method also includes performing a responsive action based on the at least one reallocation indicator.

In an additional aspect of the disclosure, an apparatus includes means for receiving, from a network, DCI for reallocating one or more resources allocated to communications for a UE. The DCI includes at least one reallocation indicator that indicates reallocation of one or more PHY layer resources allocated to the UE. The apparatus also includes means for performing a responsive action based on the at least one reallocation indicator.

In an additional aspect of the disclosure, a non-transitory computer-readable medium stores instructions that, when executed by a processor, cause the processor to perform operations. The operations include receiving, from a network, DCI for reallocating one or more resources allocated to communications for a UE. The DCI includes at least one reallocation indicator that indicates reallocation of one or more PHY layer resources allocated to the UE. The operations also include performing a responsive action based on the at least one reallocation indicator.

In an additional aspect of the disclosure, a base station includes a memory storing processor-readable code and at least one processor coupled to the memory. The at least one processor is configured to execute the processor-readable code to cause the at least one processor to initiate transmission of DCI for reallocating one or more resources allocated to communications for a UE. The DCI includes at least one reallocation indicator that indicates reallocation of one or more PHY layer resources allocated to the UE. The at least one processor is also configured to execute the processor-readable code to cause the at least one processor to communicate with a network entity that is different from the UE via the one or more PHY layer resources.

In an additional aspect of the disclosure, a method for wireless communication performed by a base station includes transmitting DCI for reallocating one or more resources allocated to communications for a UE. The DCI includes at least one reallocation indicator that indicates reallocation of one or more PHY layer resources allocated to the UE. The method also includes communicating with a network entity different from the UE via the one or more PHY layer resources.

In an additional aspect of the disclosure, an apparatus includes means for transmitting DCI for reallocating one or more resources allocated to communications for a UE. The DCI includes at least one reallocation indicator that indicates reallocation of one or more PHY layer resources allocated to the UE. The apparatus also includes means for communicating with a network entity different from the UE via the one or more PHY layer resources.

In an additional aspect of the disclosure, a non-transitory computer-readable medium stores instructions that, when executed by a processor, cause the processor to perform operations. The operations include transmitting DCI for reallocating one or more resources allocated to communications for a UE. The DCI includes at least one reallocation indicator that indicates reallocation of one or more PHY layer resources allocated to the UE. The operations also include communicating with a network entity different from the UE via the one or more PHY layer resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 illustrates an example of a reallocation message for reallocating PHY layer resources according to one or more aspects.

Like reference numbers and designations in the various drawings indicate like elements.

DETAILED DESCRIPTION

Figure 1:
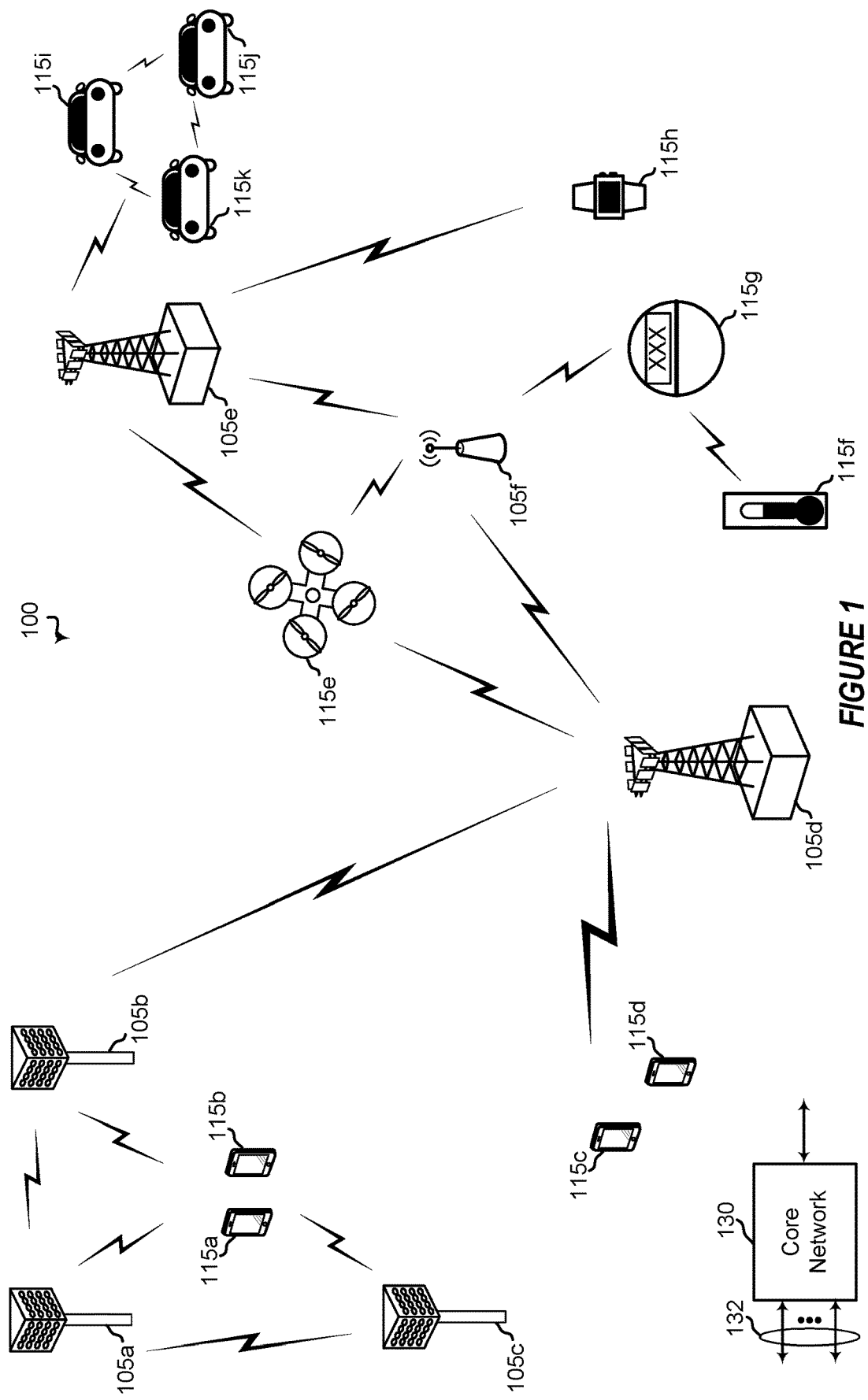
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support reallocation of physical (PHY) layer resources allocated for wireless communication. For example, the present disclosure describes techniques for a base station to communicate the reallocation of allocated communication resources using more advanced cancellation indications than time and frequency resources. Instead, the techniques described herein support reallocation PHY layer resources in the spatial domain, such as reallocation of one or more transport blocks (TB s), one or more rate-split messages, one or more PHY layers, or a combination thereof. By cancelling the allocation of PHY layer resources to a user equipment (UE) that is scheduled to communicate lower priority traffic, a base station may make available resources in the spatial domain and thereby accommodate communication by other UEs by multiplexing communications by the UEs in the spatial domain.

In some implementations, the reallocation of PHY layer resources may be communicated by modifying existing resource reallocation messages, such as downlink (DL) pre-emption messages or uplink (UL) cancellation messages used to communicate the pre-emption or cancellation of time and frequency resources for DL or UL communications, respectively, by a UE. For example, a resource reallocation message may include at least one indicator that indicates reallocation (e.g., pre-emption or cancellation) of one or more PHY layer resources allocated to communication by a UE. The at least one indicator may include a TB reallocation indicator, a rate-split message reallocation indicator, a PHY layer reallocation indicator, or a combination thereof. For example, a resource allocation message may include one indicator for reallocating a single type of PHY layer resources. Alternatively, a single resource allocation message may include multiple different indicators for reallocating multiple different types of PHY layer resources using the same message. In some implementations, the at least one indicator includes one or more bits, such as one or more bits of a particular field (e.g., a PHY layer resource field), one or more reserved bits, one or more padding bits, one or more bits of a different (e.g., unused) field, or the like, of the resource reallocation message. In some such implementations, the at least one indicator is included a resource allocation message in addition to one or more additional indicators for reallocating time and frequency resources allocated to a UE. Alternatively, the at least one indicator may not be included in the same resource allocation message as indicators for reallocating time and frequency resources. In some such implementations, the at least one indicator may replace or be interpreted from an otherwise invalid value of an indicator designated to reallocate time and frequency resources.

A base station transmits the resource reallocation message that includes the at least one indicator to a UE to notify the UE of one or more PHY layer resources that have been reallocated from the UE to another network device, such as to higher priority traffic such as ultra-reliable low latency communication (URLLC) traffic. The UE may perform a responsive action based on the at least one indicator. For example, if the at least one indicator is included in a DL pre-emption message, the UE may determine that data already received via the one or more PHY layer resources will not be completed, and thus the UE may empty a receive (RX) buffer of data received via the one or more PHY layer resources. As another example, if the at least one indicator is included in a UL cancellation message, the UE may determine that at least a portion of an upcoming UL grant is no longer valid, and the UE may refrain from communicating via the one or more PHY layer resources. As another example, if the at least one indicator is a PHY layer reallocation indicator, the UE may determine that one or more PHY layers is no longer allocated for communications, and the UE may recalculate a transport block size based in the change in allocated resources. Because the base station frees up one or more PHY layer resources, the base station is able to spatially multiplex traffic to another device with traffic to the UE via remaining spatial resources, which may improve the base station's ability to meet quality of service (QoS) requirements of higher priority traffic. For example, the base station may communicate URLLC traffic with a network entity that is different than the UE via the one or more PHY layer resources.

Particular implementations of the subject matter described in this disclosure may be implemented to realize one or more of the following potential advantages or benefits. In some aspects, the present disclosure provides techniques for supporting reallocation of PHY layer resources allocated for wireless communication. The techniques described herein enable a base station to indicate to a UE that one or more PHY layer resources have been reallocated from communications for the UE to communications with another network device, such as for higher priority traffic. Such reallocation may be useful for partially reallocating resources that are allocated by DL grants or UL grants that include multiple transport blocks or other PHY layer resources, or for partial reallocation of resources for rate-splitting configurations. By reallocating PHY layer resources, at least some communications (e.g., via remaining PHY layer resources) can be used for communications with the UE while freeing up other PHY layer resources for higher priority traffic, such as URLLC traffic. For example, the base station may spatially multiplex URLLC traffic to a different network entity with traffic to the UE, thereby supporting the more stringent QoS requirements of the URLLC traffic without degrading performance of the UE by entirely cancelling network resources allocated to communications for the UE. As such, the techniques described herein enable reallocation of network resources at different levels than typical reallocation of time and frequency resources at the resource block (RB) or resource element (RE) level. In some implementations, the techniques described herein leveraging existing time and frequency resource reallocation messaging frameworks with only a few modifications, thereby supporting reallocation of PHY layer resources for wireless communication with minimal modifications to existing wireless communication devices and communication frameworks.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces. 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF), which is an entity in the 5G Core Network (5GC) supporting various functionality, such as managing support for different location services for one or more UEs. For example the LMF may include one or more servers, such as multiple distributed servers. Base stations 105 may forward location messages to the LMF and may communicate with the LMF via a NR Positioning Protocol A (NRPPa). The LMF is configured to control the positioning parameters for UEs 115 and the LMF can provide information to the base stations 105 and UE 115 so that action can be taken at UE 115. In some implementations, UE 115 and base station 105 are configured to communicate with the LMF via an Access and Mobility Management Function (AMF).

Figure 2:
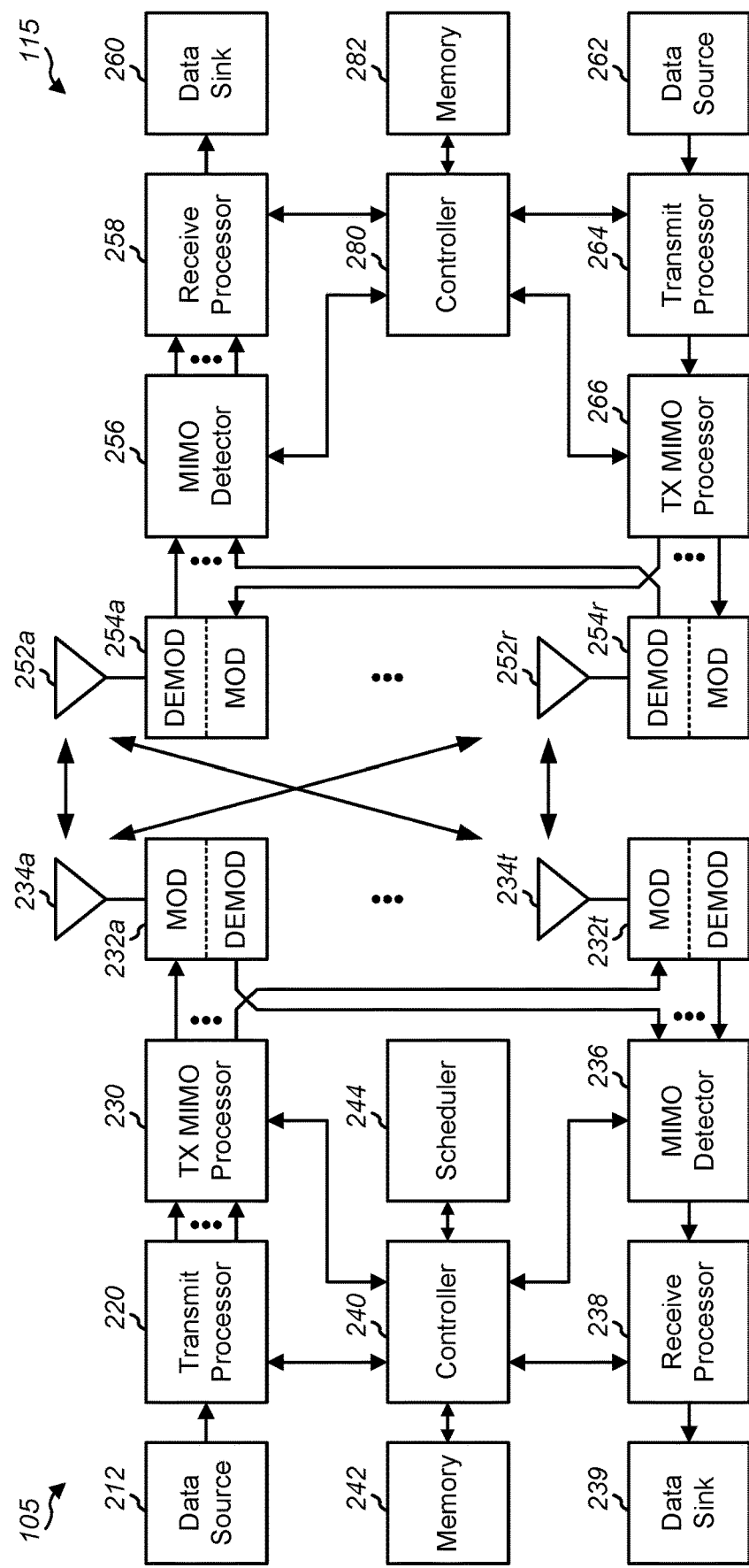
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6 and 8, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
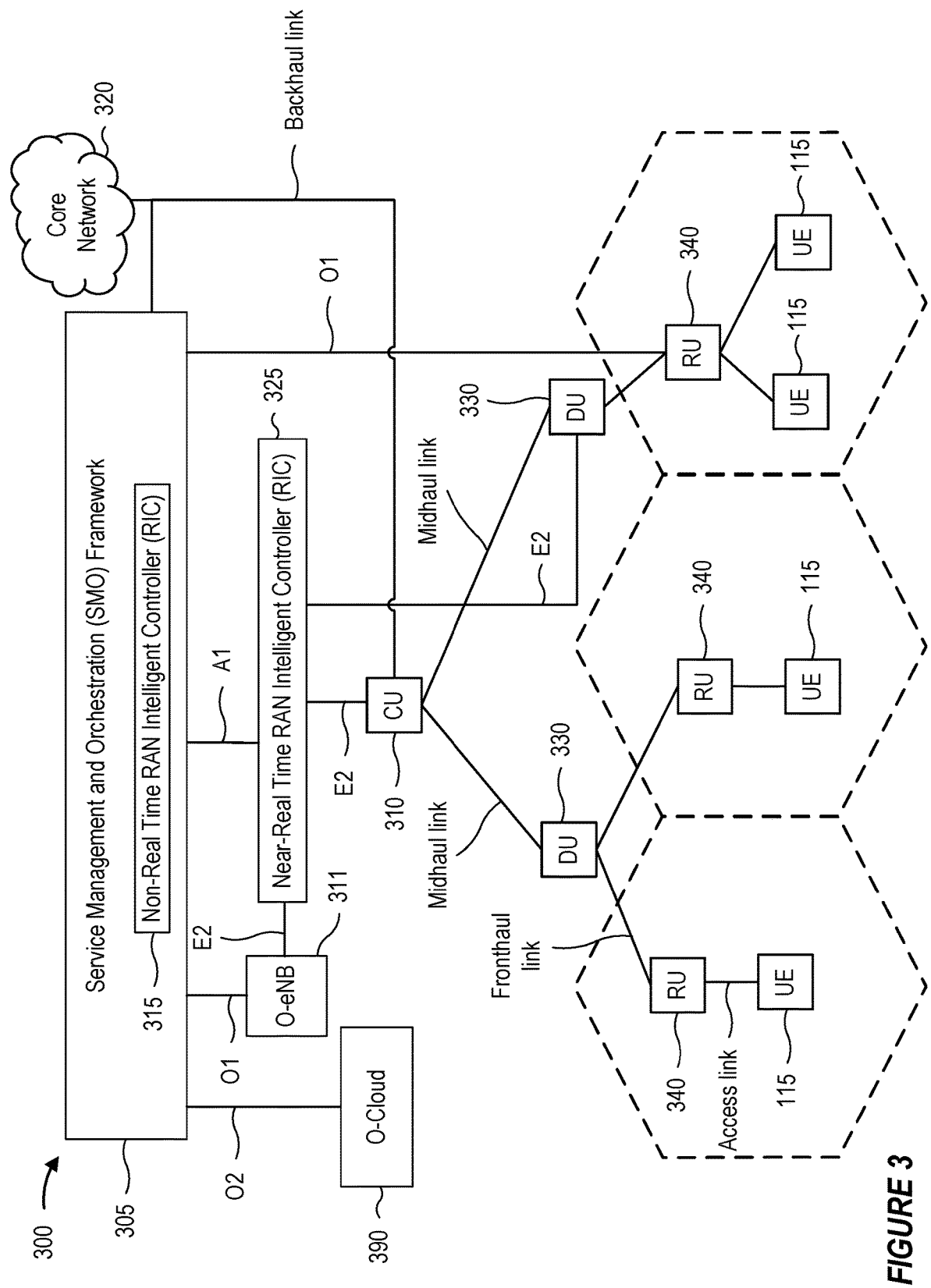
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). The core network 130 may include or correspond to the core network 130. A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RUs 340 can be implemented to handle over the air (OTA) communication with one or more UEs 115. In some implementations, real-time and non-real-time aspects of control and user plane communication with the RUs 340 can be controlled by the corresponding DU 330. In some scenarios, this configuration can enable the DUs 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate artificial intelligence/machine learning (AI/ML) models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
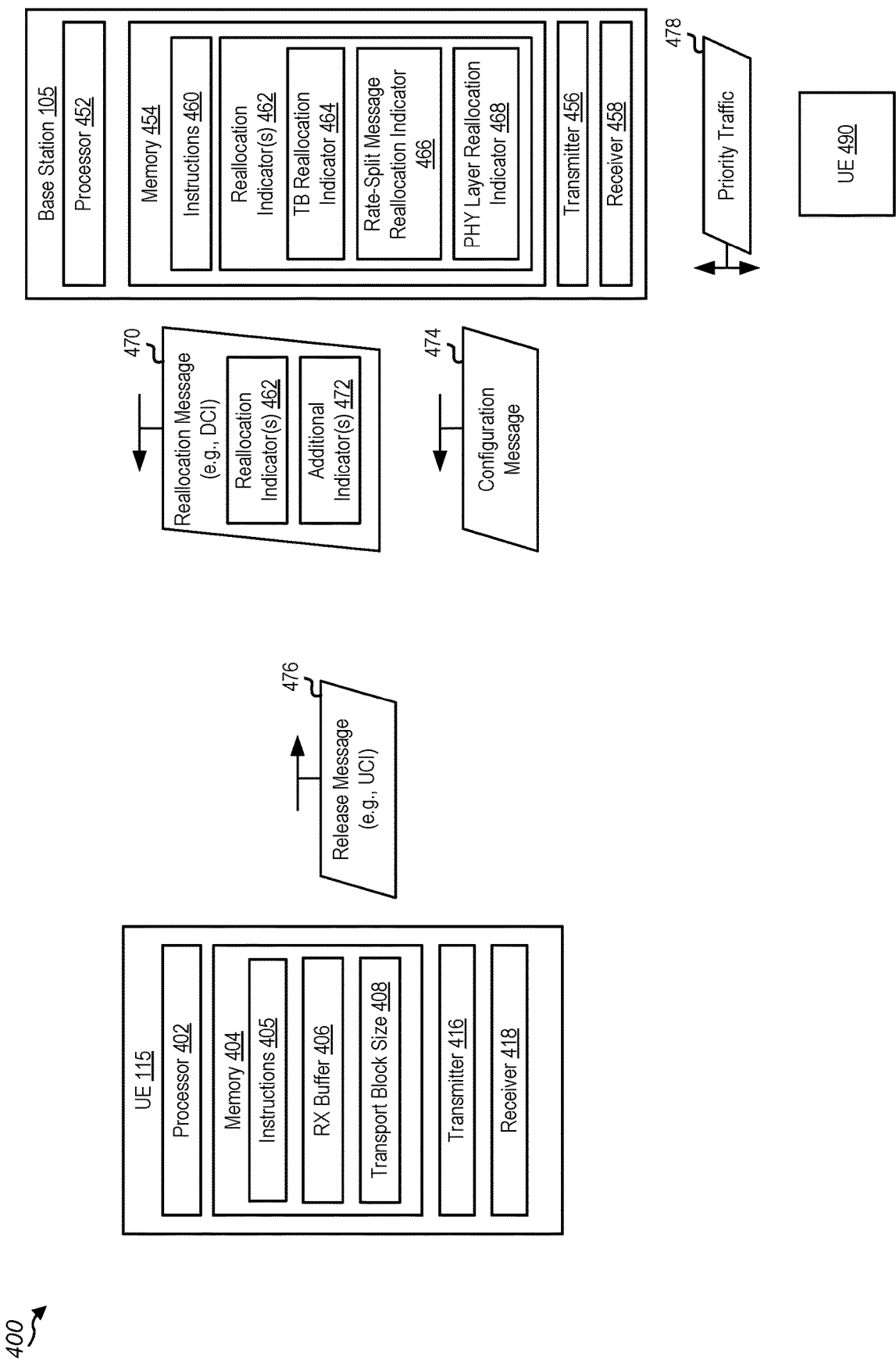
FIG. 4 is a block diagram illustrating an example wireless communication system that supports reallocation of physical (PHY) layer resources allocated for wireless communication according to one or more aspects.

FIG. 4 is a block diagram of an example wireless communications system 400 that supports reallocation of PHY layer resources allocated for wireless communication according to one or more aspects. In some examples, wireless communications system 400 may implement aspects of wireless network 100. Wireless communications system 400 includes UE 115, base station 105, and UE 490. Although two UEs (e.g., UE 115 and UE 490) and one base station 105 are illustrated, in some other implementations, wireless communications system 400 may generally include one UE or more than two UEs, and may include more than one base station 105.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 318 (hereinafter referred to collectively as "receiver 418"). In some implementations, UE 115 may include an interface (e.g., a communication interface) that includes transmitter 416, receiver 418, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405, an RX buffer 406, and a transport block size 408. RX buffer 406 includes or corresponds to a buffer that is configured to temporarily store DL data received by UE 115 for processing by processor 402. Transport block size 408 indicates size(s) of one or more transport blocks scheduled for communication by UE 115. In some implementations, transport block size 408 is based on allocated PHY layers and available antenna ports at UE 115, as further described herein.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

In some implementations, UE 115 may include one or more antenna arrays. The one or more antenna arrays may be coupled to transmitter 416, receiver 418, or a communication interface. The one or more antenna arrays may include multiple antenna elements configured to perform wireless communications with other devices, such as with the base station 105. In some implementations, the one or more antenna arrays may be configured to perform wireless communications using different beams, also referred to as antenna beams. The beams may include TX beams and RX beams. To illustrate, the one or more antenna arrays may include multiple independent sets (or subsets) of antenna elements (or multiple individual antenna arrays), and each set of antenna elements of the one or more antenna arrays may be configured to communicate using a different respective beam that may have a different respective direction than the other beams. For example, a first set of antenna elements of the one or more antenna arrays may be configured to communicate via a first beam having a first direction, and a second set of antenna elements of the one or more antenna arrays may be configured to communicate via a second beam having a second direction. In other implementations, the one or more antenna arrays may be configured to communicate via more than two beams. Alternatively, one or more sets of antenna elements of the one or more antenna arrays may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as one or more antenna arrays, in other implementations, the one or more antenna arrays may include or correspond to multiple antenna panels, and each antenna panel may be configured to communicate using a different respective beam.

UE 115 may include one or more components as described herein with reference to UE 115 of FIGS. 1-3. Additionally, UE 490 may include one or more components as described above with reference to UE 115. In some implementations, UE 115, UE 490, or both, are a 5G-capable UE, a 6G-capable UE, or a combination thereof.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, base station 105 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242.

Memory 454 includes or is configured to store instructions 460 and at least one reallocation indicator (herein "reallocation indicators 462"). Reallocation indicators 462 indicate reallocation of one or more PHY layers resources previously allocated in a communication grant, such as a DL grant or an UL grant. Reallocation indicators 462 may indicate reallocation of one or multiple types of types of PHY layer resources. In the example shown in FIG. 4, reallocation indicators 462 include a TB reallocation indicator 464, a rate-split message reallocation indicator 466, a PHY layer reallocation indicator 468, or a combination thereof. TB reallocation indicator 464 enables indication of reallocation of one or more TB s of a previous grant (e.g., a multiple TB grant), rate-split message reallocation indicator 466 enables indication of reallocation of one or more rate-split messages of a previous grant, and PHY layer reallocation indicator 468 enables indication of reallocation of one or more PHY layers of a previous grant. In some implementations, reallocation indicators 462 indicate reallocation of a single type of PHY layer resources and include only one of TB reallocation indicator 464, rate-split message reallocation indicator 466, or PHY layer reallocation indicator 468. In some other implementations, reallocation indicators 462 indicate reallocation of multiple types of PHY layer resources and include multiple or an entirety of TB reallocation indicator 464, rate-split message reallocation indicator 466, and PHY layer reallocation indicator 468.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, base station 105 may include one or more antenna arrays. The one or more antenna arrays may include multiple antenna elements configured to perform wireless communications with other devices, such as with the UE 115. In some implementations, the one or more antenna arrays may be configured to perform wireless communications using different beams, also referred to as antenna beams. The beams may include TX beams and RX beams. To illustrate, the one or more antenna arrays may include multiple independent sets (or subsets) of antenna elements (or multiple individual antenna arrays), and each set of antenna elements of the one or more antenna arrays may be configured to communicate using a different respective beam that may have a different respective direction than the other beams. For example, a first set of antenna elements of the one or more antenna arrays may be configured to communicate via a first beam having a first direction, and a second set of antenna elements of the one or more antenna arrays may be configured to communicate via a second beam having a second direction. In other implementations, the one or more antenna arrays may be configured to communicate via more than two beams. Alternatively, one or more sets of antenna elements of the one or more antenna arrays may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as one or more antenna arrays, in other implementations, the one or more antenna arrays may include or correspond to multiple antenna panels, and each antenna panel may be configured to communicate using a different respective beam.

Although described as including base station 105, wireless communications system 400 may alternatively or additionally include one or more network entities. A network entity may include base station 105, a modem, a router (e.g., a wireless router), core network 130, an LMF, or a combination thereof. In some implementations, a network entity may be configured to perform one or more operations described herein with reference to base station 105. Additionally, or alternatively, the network entity may be configured to communicate with base station 105.

In some implementations, wireless communications system 400 implements a 5G NR network. For example, wireless communications system 400 may include multiple 5G-capable UEs 115 and 490 and multiple 5G-capable base stations 105, such as UEs and base stations configured to operate in accordance with a 5G NR network protocol such as that defined by the 3GPP. In some other implementations, wireless communications system 400 implements a 6G network.

During operation of wireless communications system 400, base station 105 schedules one or more network devices for communication via wireless communications system 400, such as UE 115 or UE 490. To indicate this scheduling, base station 105 communicates allocation of network resources to the network devices via one or more DL grants or UL grants. For example, base station 105 may send a DL grant or UL grant to UE 115 to allocate network resources to DL or UL communications for UE 115. The allocation of resources may include time and frequency resources and PHY layer resources. For example, a DL or UL grant may allocate multiple TB s to a network device for wireless communications. As another example, a DL or UL grant may allocate multiple rate-split messages to a network device for wireless communications. As another example, a DL or UL grant may allocate multiple PHY layers for communication via multiple antenna ports to a network device.

After allocating one or more PHY resources to communications for UE 115 and communicating the allocation to UE 115 via a corresponding grant, base station 105 may determine to reallocate one or more PHY layer resources that are allocated to communication for UE 115. To illustrate, base station 105 may determine that, in order to satisfy requirements of a higher priority communication protocol utilized by UE 490, such as URLLC, allocation of network resources for one or more communications is needed. Based on a determination that UE 115 utilizes a lower priority communication protocol with respect to the communication protocol utilized by UE 490, base station 105 may determine to reallocate previously-allocated communication resources, particularly PHY layer resources, from UE 115 to UE 490. For example, UE 490 may communicate with base station 105 using a URLLC protocol that has more stringent QoS requirements, or other requirements, than a non-URLLC protocol used by UE 115 to communicate with base station 105. As an illustrative example, URLLC services may be expected to provide 99.99% reliability of a single transmission with a packet size of 32 bytes with latency of less than 1 ms. Instead of reallocating resources on an RB or RE level, base station 105 may determine to reallocate one or more PHY layer resources (e.g., corresponding to spatial resources) to enable use of spatial multiplexing to provide communications to both UE 115 and UE 490.

To enable reallocation of PHY layer resources, base station 105 generates reallocation indicators 462 (e.g., at least one reallocation indicator). Reallocation indicators 462 include or correspond to one or more indicators for inclusion in downlink control information (DCI) to indicate reallocation of one or more PHY layer resources allocated to UE 115 for communications. For example, reallocation indicators 462 include indicators of reallocation of one or more types of PHY layer resources that were allocated to UE 115 and indicated in a DL or UL grant to UE 115. In the example illustrated in FIG. 4, reallocation indicators 462 include TB reallocation indicator 464, rate-split message reallocation indicator 466, PHY layer reallocation indicator 468, or a combination thereof. TB reallocation indicator 464 indicates reallocation of one or more TB s of multiple TB s allocated to UE 115. For example, the DL or UL grant may have allocated multiple TB s to communications for UE 115, and TB reallocation indicator 464 may indicate reallocation of one or more of the multiple TB s, such as for communication with UE 490 by base station 105. As an illustrative example, a DL grant may include allocation of a first TB and a second TB to communications for UE 115, and TB reallocation indicator 464 may indicate reallocation of the first TB, the second TB, or both.

Rate-split message reallocation indicator 466 indicates reallocation of one or more rate-split messages allocated to UE 115. To achieve rate splitting, a message at a transmitter is split into two (or more) messages that are each encoded and modulated independently, followed by being precoded independently with a certain number of layers. As an example, a message may be split into two messages (e.g., sub-messages) X1 and X2 that each undergo individual encoding, modulation, and precoding (e.g., P1 and P2, respectively) such that a transmitting signal representing the message is given by P1X1+P2X2. Rate splitting has been shown to achieve larger degrees of freedom or capacity in wireless networks, and as such, rate splitting different messages into different sub-messages with different decodability constraints may provide improved performance for wireless communications system 400. One particular implementation of rate splitting is to apply rate splitting to private messages and common messages in the context of broadcast and interference channels. In order to free up network resources for reallocation in implementations in which transmitted signals from base station 105 include common and private messages, base station 105 may determine to reallocate PHY layer resources corresponding to a common message, one of multiple private messages, all (or some) of the multiple private messages, or an entire communication signal (e.g., the common message and all of the private messages). For example, rate-split message reallocation indicator 466 may indicate reallocation of PHY layer resources corresponding to the common message, one of the multiple private messages, all of the multiple private messages, or an entirety of the communication signal. In this manner, PHY layer resources allocated to one or more sub-messages (e.g., the common message or one or more of the private messages) may be reallocated to communication with other network devices.

PHY layer reallocation indicator 468 indicates reallocation of one or more PHY layers allocated to communications for UE 115. For example, the DL or UL grant may have allocated multiple PHY layers to communications for UE 115, and PHY layer reallocation indicator 468 may indicate reallocation of some of the allocated PHY layers, such as for communication with UE 490 by base station 105. The number of PHY layers allocated to UE 115 may be indicated by a number of antenna ports indicated by the DL or UL grant for use by UE 115. As an example, a UL grant may allocate four PHY layers to communications for UE 115, and PHY layer reallocation indicator 468 may indicate reallocation of two of the four PHY layers. As another example, a UL grant may allocate eight PHY layers to communications for UE 115, and PHY layer reallocation indicator 468 may indicate reallocation of four of the eight PHY layers.

Reallocation indicators 462 may include or correspond to one or more fields of a message, one or more bits of a particular field (e.g., a PHY layer resource reallocation field), one or more bits of a different particular field (e.g., a RB or other time and frequency resources reallocation field), one or more reserved bits, one or more padding bits, other fields or bits, or a combination thereof. In some implementations, a quantity of bits or elements included in reallocation indicators 462 is the same as a quantity of PHY layer resources allocated to UE 115, and a respective value of each bit or element of reallocation indicators 462 represents an indication (e.g., a binary indicator) of whether a corresponding PHY layer resource is to be reallocated (or not reallocated). In some other implementations, a quantity of bits or elements included in reallocation indicators 462 is less than a quantity of PHY layer resources allocated to UE 115, and a respective value of each bit or element of reallocation indicators 462 represents an indication of whether a corresponding preconfigured one or more PHY layer resources is reallocated. For example, the preconfigured PHY layer resources may include a TB having the most layers of other allocated TBs, a TB having a smallest modulation and coding scheme (MCS) of other allocated TBs, a highest PHY layer, or the like. Examples of illustrative reallocation indicators are further described herein with reference to FIG. 5.

To communicate reallocation indicators 462 to UE 115, base station 105 generates and transmits reallocation message 470 to UE 115. Reallocation message 470 may be communicated as downlink control information (DCI), such as via a physical downlink control channel (PDCCH), and reallocation message 470 includes reallocation indicators 462 (e.g., TB reallocation indicator 464, rate-split message reallocation indicator 466, PHY layer reallocation indicator 468, or a combination thereof). For example, reallocation message 470 may include reallocation indicators 462 as one or more fields or one or more bits, as further described herein. In some implementations, reallocation message 470 includes or corresponds to a DL pre-emption message or a UL cancellation message. For example, if UE 115 received a DL grant from base station 105, reallocation message 470 is a DL pre-emption message that indicates pre-emption of one or more network resources allocated to UE 115. As another example, if UE 115 received a UL grant from base station 105, reallocation message 470 is a UL cancellation message that indicates cancellation of one or more network resources allocated to UE 115. As used herein, the different between cancellation and pre-emption is that pre-emption may be communicated after use of at least a portion of the network resources by UE 115, and as such data received via the portion of network resources is part of one or more packets, transport blocks, or the like, that will not be completed due to the reallocation of the remainder of the network resources, while cancellation is communicated prior to use of any of the reallocated network resources to prevent communication via the reallocated communication resources. UL cancellation may have a larger impact on performance than DL pre-emption, as DL pre-emption only results in the scheduled UE being unable to correctly decode received data, while UL cancellation causes a UE to cancel an entire UL transmission (including both control information and data) and wait for a rescheduled opportunity.

In some implementations, reallocation message 470 includes reallocation indicators for both PHY layer resources and time and frequency resources (e.g., RBs or REs). For example, reallocation message 470 (e.g., the DCI) includes reallocation indicators 462 that indicate reallocation of the one or more PHY layer resources and one or more additional indicators (herein "additional indicators 472") that indicate reallocation of one or more time and frequency resources (e.g., one or more REs or RBs) allocated to UE 115. In such implementations, a single DL pre-emption message or a single UL cancellation message can indicate reallocation of both PHY layer resources (e.g., spatial resources) and RBs or REs (e.g., time and frequency resources). In some other implementations, reallocation message 470 includes reallocation indicators 462 and does not include additional indicators 472. For example, reallocation indicators 462 may replace additional indicators 472 or reallocation indicators 462 may be derived from values of additional indicators 472 such that existing messaging frameworks can be leveraged to indicate reassignment of PHY layer resources (e.g., spatial resources) without modification to the structure of the messages. For example, additional indicators 472 having a preset value associated with an invalid reallocation of time and frequency resources may be interpreted by base station 105 and UE 115 as reallocation of PHY layer resources (e.g., as reallocation indicators 462). As a non-limiting example, if additional indicators 472 is a multibit value with each bit indicating reallocation (or not) of a corresponding set of time and frequency resources, a value of zero would otherwise indicate that no time and frequency resources are being reallocated. As indicating that no time and frequency resources are being reallocated makes reallocation message 470 redundant, network devices within wireless communications system 400 may be configured to interpret a value of zero (or any other invalid or preconfigured value) as an indicator that a particular set of one or more PHY layer resources are reallocated. The particular set of PHY layer resources may be pre-configured using additional messaging, as further described herein, or may be preprogrammed at UE 115 and base station 105.

UE 115 may receive reallocation message 470 and perform a responsive action based on reallocation indicators 462. For example, UE 115 may perform a responsive action to account for the reallocation of one or more PHY layer resources indicated by reallocation indicators 462 included in reallocation message 470. The reallocated PHY layer resources may be determined by UE 115 based on reallocation indicators 462, the originally allocated resourced indicated by the previous grant, and optionally additional information such as preconfigured information. In some implementations, each bit or value of reallocation indicators 462 may indicate whether a corresponding PHY layer resource is reallocated. As an example, a DL or UL grant received by UE 115 may allocate a first TB and a second TB to UE 115, and TB reallocation indicator 464 in this example is a two-bit value with a first bit representing a binary indicator of whether the first TB is reallocated and a second bit representing a binary indicator of whether the second TB is reallocated. As another example, a DL or UL grant received by UE 115 may allocate PHY layer resources for a communication signal that includes a common message and two private messages to UE 115, and rate-split message reallocation indicator 466 in this example may be a four-bit value having a first bit representing a binary indicator of whether PHY layer resources corresponding to the common message are reallocated, a second bit representing a binary indicator of whether PHY layer resources corresponding to a private message for UE 115 are reallocated, a third bit representing a binary indicator of whether PHY layer resources corresponding to all of the private messages are reallocated, and a fourth bit representing a binary indicator of whether PHY layer resources corresponding to the entire communication signal are reallocated. As another example, a DL or UL grant received by UE 115 may allocate eight PHY layers (e.g., PHY layers one-eight) to UE 115, and PHY layer reallocation indicator 468 in this example may be a two-bit value with a first bit representing a binary indicator of whether the second four PHY layers (e.g., PHY layers five-eight) are reallocated and a second bit representing a binary indicator of whether the second two PHY layers (e.g., PHY layers three and four) are reallocated.

In some other implementations, each bit or value of reallocation indicators 462 may indicate whether a preconfigured set of one or more PHY layer resources are reallocated. Additionally or alternatively, presence of a preset value associated with an invalid reallocation of time and frequency resources as additional indicators 472 may indicate whether a preconfigured set of one or more PHY layer resources are reallocated. To illustrate, base station 105 may transmit configuration message 474 to UE 115 prior to transmission of DL or UL grants and reallocation message 470. Configuration message 474 identifies one or more preconfigured PHY layer resources and corresponding bits of the at least one reallocation indicators. As an example, configuration message 474 may indicate that a reallocation messages include a single bit as reallocation indicators 462 that indicates whether a TB having the smallest MCS of a multi-TB grant is reallocated. As another example, configuration message 474 may indicate that a reallocation messages include a single bit as reallocation indicators 462 that indicates whether a TB having the most layers of a multi-TB grant is reallocated. As another example, configuration message 474 may indicate that a reallocation messages include two bits as reallocation indicators 462, with a first bit indicating whether a private message addressed to UE 115 is reallocated and a second bit indicating whether all private messages are reallocated. As another example, configuration message 474 may indicate that a reallocation messages include two bits as reallocation indicators 462, with a first bit indicating whether a TB having a largest TB size is reallocated and a second bit indicating whether the four highest PHY layers are reallocated. These examples are illustrative and not limiting, as other configurations of reallocation indicators 462 and correlation to PHY layer resources are possible. In some implementations, configuration message 474 is a radio resource control (RRC) message transmitted by base station 105.

The responsive action may also be based on the type of grant (e.g., DL grant or UL grant) that identified the PHY layer resources that are now being reallocated. As one example, if a DL grant was previously received and reallocation message 470 is a DL pre-emption message, the responsive action may include clearing a buffer (e.g., RX buffer 406) of data received via the one or more PHY layer resources during the DL grant. For example, UE 115 may receive a portion of data during the DL grant prior to receipt of reallocation message 470, and this data is stored in RX buffer 406. In this example, based on reallocation message 470 (e.g., reallocation indicators 462), UE 115 clears data stored in RX buffer 406 that was received via any of the reallocated PHY layer resources, as a remainder of the data will not be received during the DL grant via these PHY layer resources due to the reallocation (e.g., the DL pre-emption). As another example, if a UL grant was previously received and reallocation message 470 is a uplink (UL) cancellation indication (ULCI) message, the responsive action may include refraining from communicating with the network via the one or more PHY layer resources during the UL grant. For example, a UL grant may indicate a set of PHY layer resources that are assigned to UE 115 for UL transmissions, and reallocation message 470 (e.g., reallocation indicators 462) indicates that the set of PHY layer resources are cancelled. In this example, UE 115 refrains from communicating with base station 105 via the set of PHY layer resources during the UL grant, although UE 115 may communicate with base station 105 via other resources assigned in the UL grant (if there are any remaining resources that are not canceled). The responsive action may also be based on a type of PHY layer resource that is reallocated by reallocation message 470. As an example, if reallocation indicators 462 includes PHY layer reallocation indicator 468, the responsive action may include recalculating a transport block size for communication with the network via remaining allocated PHY layers (e.g., performing TB scaling based on the reallocation of PHY layers). For example, based on a DL or UL grant, UE 115 determines transport block size 408 based on the available resources indicated by the DL or UL grant. In this example, if UE 115 later determines, based on PHY layer reallocation indicator 468 included in reallocation message 470, that one or more PHY layers that were previously allocated to UE 115 have been reallocated, UE 115 recalculates transport block size 408 based on the reduction in available PHY layers for wireless communications. Although particular responsive actions are described herein, this disclosure is not so limited, and other responsive actions that account for reallocation of PHY layer resources are contemplated in other examples.

After sending reallocation message 470 to UE 115, base station 105 communicates with a network entity that is different from UE 115 via the one or more reallocated PHY layer resources. For example, base station 105 may communicate priority traffic 478 with UE 490 via at least the reallocated PHY layer resources indicated by reallocation message 470. As explained above, priority traffic 478 may include URLLC traffic or traffic associated with another communication protocol that has more stringent requirements than a communication protocol used by UE 115 to communicate with base station 105. Base station 105 may communicate with UE 490 and UE 115 during a particular grant by spatially multiplexing priority traffic 478 (e.g., URLLC traffic) to UE 490 via the one or more PHY layer resources with traffic to UE 115 via other PHY layer resources during a common time period (e.g., during a DL or UL grant assigned to UE 115).

In some implementations, base station 105 selects the one or more PHY layers to be reallocated based on priority traffic 478 having higher priority (e.g., more stringent QoS or other requirements) than traffic to UE 115 and, optionally, other information or configuration at base station 105. For example, base station 105 may determine to reallocate PHY layer resources to priority traffic 478 based on estimated error rates of UE 115 and UE 490, estimated latency of communications to UE 115 and UE 490, order of association with base station 105 by various UE 115 and UE 490, one or more scheduling schemes (e.g., first served, round robin, or the like), other information, or a combination thereof. Additionally or alternatively, base station 105 may select the one or more PHY layers to be reallocated based on a communication from UE 115 indicating release of PHY layer resource(s). For example, prior to any reallocation determination at base station 105, UE 115 may transmit release message 476 to base station 105. Base station 105 receives, prior to determining reallocation indicators 462, release message 476 that indicates one or more released PHY layer resources by UE 115. In some implementations, release message 476 includes or corresponds to UCI transmitted by UE 115 via a PUCCH. The one or more released PHY layer resources indicated by release message 476 may include or correspond to one or more TBs of multiple TBs allocated to UE 115, a common message of a rate-split communication signal allocated to UE 115, a private message of the rate split communication, an entirety of the rate-split communication signal, one or more PHY layers allocated to UE 115, or a combination thereof, and the indicators may be similar to reallocation indicators 462 (e.g., TB reallocation indicator 464, rate-split message reallocation indicator 466, PHY layer reallocation indicator 468, or a combination thereof). UE 115 may release the PHY layer resources based on a determination that UE 115 does not have data to transmit via the PHY layer resources, based on a determination that UE 115 has low power that is insufficient to perform the assigned communications, or the like. Based on receiving release message 476, base station 105 may reallocate one or more of the released PHY layer resources to communication of priority traffic 478 to UE 490.

As described with reference to FIG. 4, the present disclosure provides techniques for reallocation of PHY layer resources allocated for wireless communication. The techniques described herein enable base station 105 to indicate to UE 115 that one or more PHY layer resources have been reallocated from communications for UE 115 to communications with another network device (e.g., UE 490), such as for priority traffic 478. Such reallocation may be useful for partially reallocating resources that are allocated by DL grants or UL grants to UE 115 that include multiple TBs or other PHY layer resources, or for partial reallocation of resources for rate-splitting configurations of wireless communications system 400. By reallocating PHY layers resources, at least some communications (e.g., via remaining PHY layer resources) can be performed between UE 115 and base station 105 while freeing up other PHY layer resources for communication of priority traffic 478 to UE 490, such as URLLC traffic with more stringent QoS requirements. For example, base station 105 may spatially multiplex priority traffic 478 (e.g., URLLC traffic) to UE 490 with lower priority traffic to UE 115, thereby supporting the more stringent QoS requirements of priority traffic 478 without degrading performance of UE 115 by entirely cancelling network resources allocated to communications for UE 115. As such, wireless communications system 400 enables reallocation of network resources at different levels than typical reallocation of time and frequency resources at the RB or RE level, resulting in more efficient use of communication resources in the context of PHY layer resources. In some implementations, wireless communications system 400 leverages existing time and frequency resource reallocation messaging frameworks (e.g., DL pre-emption messages, ULCI messages, or both) with only a few modifications, thereby supporting reallocation of PHY layer resources for wireless communication within wireless communications system 400 with minimal modifications to existing wireless communication devices and communication messaging.

Referring to FIG. 5, an example of a reallocation message for reallocating PHY layer resources according to one or more aspects is shown as reallocation message 500. Reallocation message 500 may be a DCI or other type of message used by a base station or other network entity to indicate reallocation of one or more PHY layer resources to UEs or other network entities that have already been assigned network resources, such as via a DL grant or a UL grant. In some implementations, reallocation message 500 includes or correspond to reallocation message 470 of FIG. 4.

In the example shown in FIG. 5, reallocation message 500 includes a header 502, one or more other fields 504, one or more PHY reallocation indicators 506, and one or more additional reallocation indicators 508. The example shown in FIG. 5 is illustrative, and in some other implementations, other fields 504, additional reallocation indicators 508, or both are optional and may not be included, or additional fields or bits (e.g., padding bits) may be included in reallocation message 500. Header 502 includes one or more bits or values that indicate a message type of reallocation message 500, one or more fields included in reallocation message 500, other information, or the like. Other fields 504 include other fields of reallocation message 500 in addition to header 502 and reallocation indicators 506 and 508, such as other fields of a DCI. PHY reallocation indicators 506 include one or more indicators that indicate reallocation of corresponding PHY layer resources and additional reallocation indicators 508 include one or more indicators that indicate reallocation of corresponding time and frequency resources. In some implementations, PHY reallocation indicators 506 and additional reallocation indicators 508 include or correspond to reallocation indicators 462 and additional indicators 472 of FIG. 4, respectively. Although shown as respective fields of reallocation message 500, in some other implementations, PHY reallocation indicators 506, additional reallocation indicators 508, or both may not be fields and may instead be repurposed or otherwise unused bits of reallocation message 500, such as reserved bits, padding bits, or the like.

PHY reallocation indicators 506 may include one or more TB reallocation indicators, one or more rate-split message reallocation indicators, one or more PHY layer reallocation indicators, or any combination thereof. In some implementations, PHY reallocation indicators 506 may include one or more of TB reallocation indicator 464, rate-split message reallocation indicator 466, and PHY layer reallocation indicator 468 of FIG. 4. The various types of indicators may include one or more bits that each correspond to one of N allocated PHY layer resources, one or more bits that each correspond to a preconfigured set of allocated PHY layer resources, or an invalid (or other preset) value of reallocated time and frequency resources. To illustrate, FIG. 5 depicts three examples of PHY reallocation indicators 506: a first PHY reallocation indicator 510, a second PHY reallocation indicator 520, and a third PHY reallocation indicator 530. Each of these example PHY reallocation indicators correspond to one of the above-described implementations of indicators.

First PHY reallocation indicator 510 corresponds to an example of an indicator that includes bits that each correspond to one of N allocated PHY layer resources. To illustrate, first PHY reallocation indicator 510 includes a first indicator 512, a second indicator 514, and an Nth indicator 516, and first PHY reallocation indicator 510 is configured to indicate whether each of N PHY layer resources indicated in a previous DL or UL grant are to be reallocated. Although three indicators are shown with respect to first PHY reallocation indicator 510 in FIG. 5, in other examples, N may be fewer than three or more than three. Each of indicators 512-516 is a bit that represents a binary indicator of whether a corresponding PHY layer resource is indicated as being reallocated. Stated another way, first PHY reallocation indicator 510 indicates reallocation of multiple PHY layer resources that were allocated to a UE (e.g., UE 115 of FIG. 4) by a previous grant, and first PHY reallocation indicator 510 includes multiple bits having a same quantity as a number (e.g., N) of allocated PHY layer resources with each bit indicating whether a corresponding PHY layer resource is reallocated. As an example, a previous grant may allocate three TB s (e.g., N is three) to a UE, first indicator 512 is a bit having either a first value (e.g., 1) that represents reallocation of the first TB or a second value (e.g., 0) that represents no reallocation of the first TB, second indicator 514 is a bit having either the first value that represents reallocation of the second TB or the second value that represents no reallocation of the second TB, and Nth indicator 516 is a bit having either the first value that represents reallocation of the third TB or the second value that represents no reallocation of the third TB. As another example, a previous grant may allocate a rate-split signal that includes a common message, a first private message allocated to the UE, and a second private message allocated to another UE, first indicator 512 is a bit having a binary value indicating whether resources corresponding to the common message are reallocated, second indicator 514 is a bit having a binary value indicating whether resources corresponding to the first private message are reallocated, a third indicator (not shown) is a bit having a binary value indicating whether resources corresponding to all of the private messages are reallocated, and Nth indicator 516 (e.g., N is four is this example) is a bit having a binary value indicating whether resources corresponding to an entirety of the signal are reallocated. Although the above-described examples correspond to a single type of PHY layer resource, in other examples, first PHY reallocation indicator 510 may include indicators that correspond to multiple types of PHY layer resources.

Second PHY reallocation indicator 520 corresponds to an example of an indicator that includes that each correspond to a preconfigured set of allocated PHY layer resources. To illustrate, second PHY reallocation indicator 520 includes a first indicator 522, a second indicator 524, and an Mth indicator 566, and second PHY reallocation indicator 520 is configured to indicate whether particular preconfigured sets of PHY layer resources indicated in a previous DL or UL grant are to be reallocated. Although three indicators are shown with respect to second PHY reallocation indicator 520 in FIG. 5, in other examples, second PHY reallocation indicator 520 may include fewer than three or more than three indicators. Each of indicators 522-526 is a bit that represents a binary indicator of whether a corresponding set of one or more PHY layer resources are indicated as being reallocated. Stated another way, second PHY reallocation indicator 520 indicates reallocation of set(s) of one or more PHY layer resources that were allocated to a UE (e.g., UE 115 of FIG. 4) by a previous grant. Unlike for first PHY reallocation indicator 510, for second PHY reallocation indicator 520 each bit indicates whether a corresponding preconfigured set of one or more PHY layer resources are reallocated, and thus the number of bits (e.g., M) of second PHY reallocation indicator 520 may be less than a number of allocated PHY layer resources (e.g., N). The correspondence between each indicator (e.g., bit) of second PHY reallocation indicator 520 and one or more PHY layer resources is preconfigured at the UE, such as by an RRC message, another DCI message, or another type of communication that indicates the preconfigured correspondence. For example, a base station may transmit an RRC message, such as configuration message 474 of FIG. 4, that indicates which PHY layer resource(s) correspond to first indicator 522, which PHY layer resource(s) correspond to second indicator 524, and which PHY layer resource(s) correspond to Mth indicator 526. As an example, a previous grant may allocate three TB s and eight PHY layers to a UE, first indicator 522 is a bit having either a first value (e.g., 1) that represents reallocation of a TB having a smallest MCS or a second value (e.g., 0) that represents no reallocation of the TB having the smallest MCS, second indicator 524 is a bit having either the first value that represents reallocation of a TB with the most PHY layers or the second value that represents no reallocation of the TB with the most PHY layers, and Mth indicator 526 is a bit having either the first value that represents reallocation of the highest four PHY layers or the second value that represents no reallocation of the highest four PHY layers. Although the above-described example corresponds to multiple types of PHY layer resources, in other examples, second PHY reallocation indicator 520 may include indicator(s) that correspond to a single type of PHY layer resources or may include a single indicator.

Third PHY reallocation indicator 530 corresponds to an example of an indicator that includes an invalid (or other preset) value of reallocated time and frequency resources. To illustrate, third PHY reallocation indicator 530 may include or correspond to one of additional reallocation indicators 508 and include an invalid time/freq indicator 532. For example, a previous DL or UL grant may allocate time and frequency resources to a UE, and invalid time/freq indicator 532 may be an invalid value, such as a null or all-zero value, that would otherwise indicate that none of the allocated time and frequency resources are being reallocated. Alternatively, invalid time/freq indicator 532 may be any preconfigured or preset value. The present of invalid time/freq indicator 532 in reallocation message 500 indicates that a preconfigured set of one or more allocated PHY layer resources are reallocated. The correspondence between invalid time/freq indicator 532 and one or more PHY layer resources is preconfigured at the UE, such as by an RRC message, another DCI message, or another type of communication that indicates the preconfigured correspondence. For example, a base station may transmit an RRC message, such as configuration message 474 of FIG. 4, that indicates which PHY layer resource(s) are reallocated by presence of invalid time/freq indicator 532. As an example, a previous grant may allocate a rate-split signal to the UE, the signal including a common message, a first private message allocated to the UE, a second private message allocated to another UE, and a third private message allocated to yet another UE, and reallocation message 500 including invalid time/freq indicator 532 may indicate that resources corresponding to the common message and the first private message are reallocated.

Figure 6:
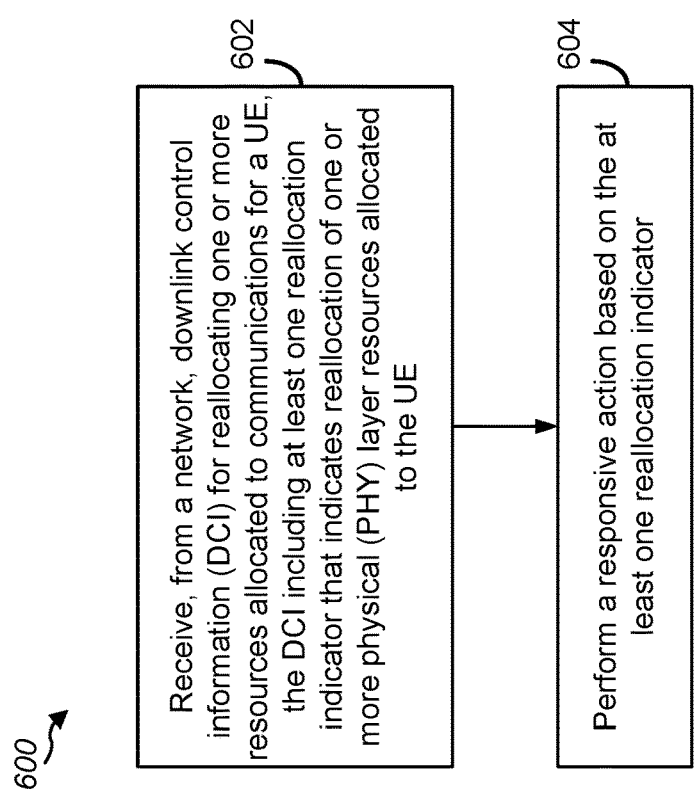
FIG. 6 is a flow diagram illustrating an example process that supports reallocation of PHY layer resources allocated for wireless communication according to one or more aspects.

FIG. 6 is a flow diagram illustrating an example process 600 that supports reallocation of PHY layer resources allocated for wireless communication according to one or more aspects. Operations of process 600 may be performed by a UE, such as UE 115 described above with reference to FIGS. 1-4, or a UE described with reference to FIG. 7. For example, example operations (also referred to as "blocks")

of process 600 may enable UE 115 to support reallocation of PHY layer resources allocated for wireless communication.

At block 602, the UE receives, from a network, DCI for reallocating one or more resources allocated to communications for the UE. The DCI includes at least one reallocation indicator that indicates reallocation of one or more PHY layer resources allocated to the UE. For example, the DCI may include or correspond to reallocation message 470 of FIG. 4, and the at least one reallocation indicator may include or correspond to the reallocation indicators 462 of FIG. 4. In some implementations, the DCI includes the at least one reallocation indicator that indicates reallocation of the one or more PHY layer resources and an additional indicator that indicates reallocation of one or more time and frequency resources allocated to the UE. For example, the additional indicator may include or correspond to additional indicators 472 of FIG. 4. At block 604, the UE performs a responsive action based on the at least one reallocation indicator. For example, UE 115 of FIG. 4 may perform a responsive action based on receipt of reallocation message 470 that includes reallocation indicators 462.

In some implementations, the DCI includes a DL preemption message and the responsive action includes clearing a buffer of data received via the one or more PHY layer resources during a corresponding DL grant. For example, reallocation message 470 of FIG. 4 may be a DL preemption message, and the buffer may include or correspond to RX buffer 406 of FIG. 4. In some alternate implementations, the DCI includes a ULCI message and the responsive action includes refraining from communicating with the network via the one or more PHY layer resources during a corresponding uplink grant. For example, reallocation message 470 of FIG. 4 may be a ULCI message, and UE 115 may refrain from communicating with base station 105 via the PHY layer resources indicated by reallocation indicators 462 during a UL grant.

In some implementations, the at least one reallocation indicator includes a TB reallocation indicator, a rate-split message reallocation indicator, a layer reallocation indicator, or a combination thereof. For example, the TB reallocation indicator may include or correspond to TB reallocation indicator 464 of FIG. 4, the rate-split message reallocation indicator may include or correspond to rate-split message reallocation indicator 466 of FIG. 4, and the layer reallocation indicator may include or correspond to PHY layer reallocation indicator 468 of FIG. 4. In some such implementations, the at least one reallocation indicator includes the TB reallocation indicator and the one or more PHY layer resources correspond to one or more TBs of multiple TBs allocated to the UE. For example, TB reallocation indicator 464 of FIG. 4 indicates one or more TBs of multiple TBs allocated to UE 115. Additionally or alternatively, the at least one reallocation indicator includes the layer reallocation indicator and the one or more PHY layer resources correspond to one or more PHY layers allocated to the UE. For example, PHY layer reallocation indicator 468 of FIG. 4 indicates one or more PHY layers allocated to UE 115. Additionally or alternatively, the at least one reallocation indicator includes the rate-split message reallocation indicator and the one or more PHY layer resources correspond to one or more rate-split messages allocated to the UE. For example, rate-split message reallocation indicator 466 of FIG. 4 indicates one or more rate-split messages allocated to UE 115. In some such implementations, the one or more PHY layer resources are allocated to a communication signal that includes a common message and multiple private messages, and the rate-split message reallocation indicator indicates reallocation of PHY layer resources corresponding to the common message, one of the multiple private messages, all of the multiple private messages, or an entirety of the communication signal.

In some implementations, the at least one reallocation indicator indicates reallocation of multiple PHY layer resources allocated to the UE and the at least one reallocation indicator includes multiple bits having a same quantity as the multiple PHY layer resources. Each bit of the multiple bits indicates whether a corresponding PHY layer resource of the multiple PHY layer resources is reallocated. For example, the at least one reallocation indicator may include or correspond to first PHY reallocation indicator 510 of FIG. 5, and the multiple bits may include or correspond to first indicator 512, second indicator 514, and Nth indicator 516 of FIG. 5.

In some implementations, the at least one reallocation indicator includes one or more bits having a quantity less than the one or more PHY layer resources. Each bit of the one or more bits indicates whether a corresponding preconfigured PHY layer resource of the one or more PHY layer resources is reallocated. For example, the at least one reallocation indicator may include or correspond to second PHY reallocation indicator 520 of FIG. 5, and the one or more bits may include or correspond to one or more of first indicator 522, second indicator 524, and Mth indicator 526. In some such implementations, process 600 further includes receiving a RRC message from the network. The RRC identifies one or more preconfigured PHY layer resources and corresponding bits of the at least one reallocation indicators. For example, the RRC message may include or correspond to configuration message 474 of FIG. 4.

In some implementations, the at least one reallocation indicator includes a time and frequency resources reallocation indicator having a preset value associated with an invalid reallocation of time and frequency resources. For example, the at least one reallocation indicator may include or correspond to third PHY reallocation indicator 530 of FIG. 5, and the preset value may include or correspond to invalid time/freq indicator 532 of FIG. 5.

Figure 7:
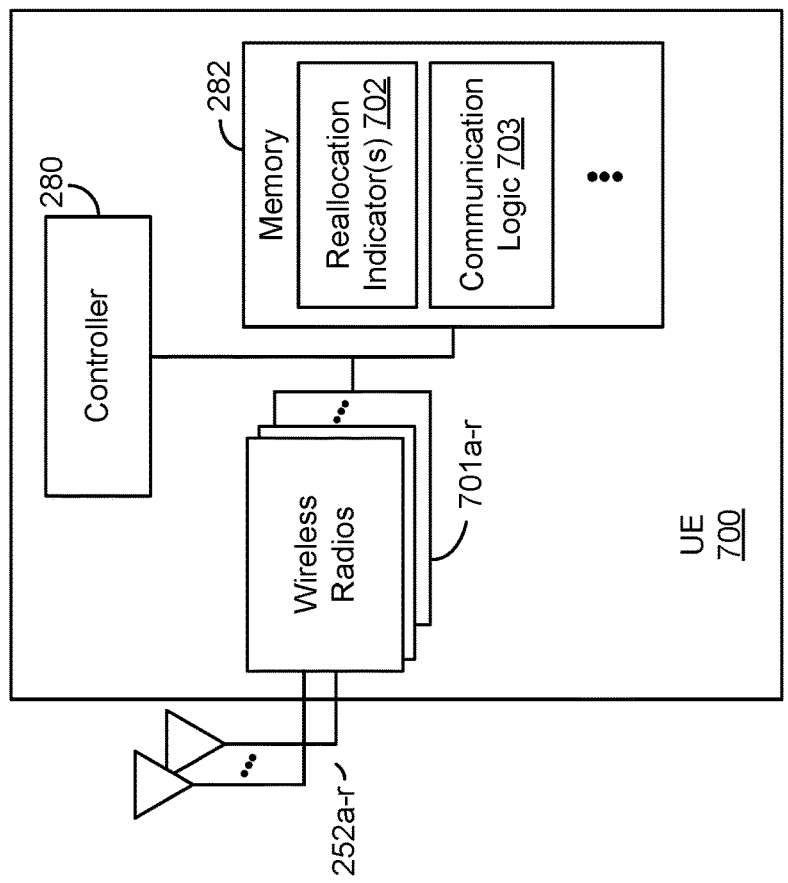
FIG. 7 is a block diagram of an example UE that supports reallocation of PHY layer resources allocated for wireless communication according to one or more aspects.

FIG. 7 is a block diagram of an example UE 700 that supports reallocation of PHY layer resources allocated for wireless communication to one or more aspects. UE 700 may be configured to perform operations, including the blocks of a process described with reference to FIG. 6. In some implementations, UE 700 includes the structure, hardware, and components shown and described with reference to UE 115 of FIGS. 1-4. For example, UE 700 includes controller 280, which operates to execute logic or computer instructions stored in memory 282, as well as controlling the components of UE 700 that provide the features and functionality of UE 700. UE 700, under control of controller 280, transmits and receives signals via wireless radios 701*a-r* and antennas 252*a-r*. Wireless radios 701*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include reallocation indicators 702 (e.g., at least one reallocation indicator) and communication logic 703. Reallocation indicators 702 may be included in reallocation message(s) received by UE 700 and may indicate one or more PHY layer resources that are reallocated. For example, reallocation indicators 702 may include or correspond to reallocation indicators 462 of FIG. 4. Communication logic 703 may be configured to enable communication between UE 700 and one or more other devices. UE 700 may receive signals from or transmit signals to one or more network entities, such as base station 105 of FIGS. 1-4 or a base station as illustrated in FIG. 9.

Figures 8, 9:
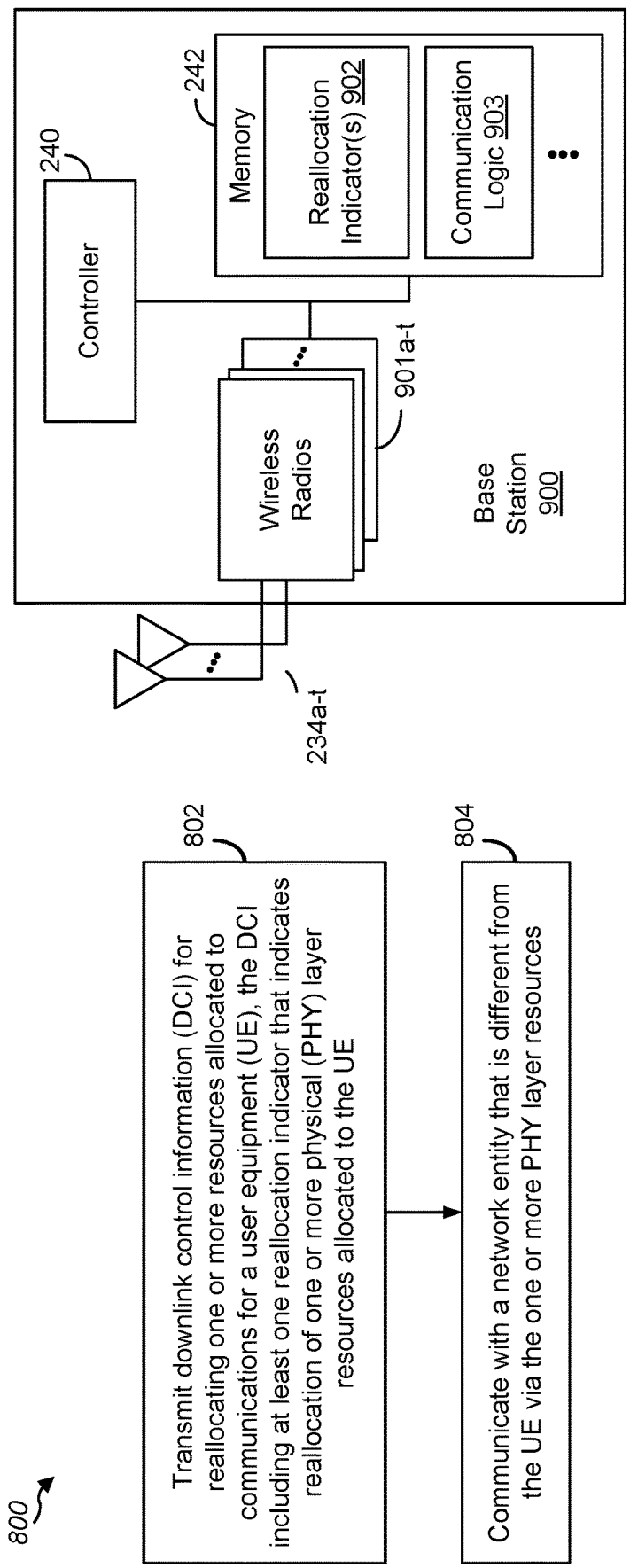
FIG. 8 is a flow diagram illustrating an example process that supports reallocation of PHY layer resources allocated for wireless communication according to one or more aspects.
FIG. 9 is a block diagram of an example base station that supports reallocation of PHY layer resources allocated for wireless communication according to one or more aspects.

FIG. 8 is a flow diagram illustrating an example process 600 that supports reallocation of PHY layer resources allocated for wireless communication according to one or more aspects. Operations of process 800 may be performed by a base station, such as base station 105 described above with reference to FIGS. 1-4 or a base station as described above with reference to FIG. 9. For example, example operations of process 800 may enable base station 105 to support reallocation of PHY layer resources allocated for wireless communication.

At block 802, the base station transmits DCI for reallocating one or more resources allocated to communications for a UE. The DCI includes at least one reallocation indicator that indicates reallocation of one or more PHY layer resources allocated to the UE. For example, the DCI may include or correspond to reallocation message 470 of FIG. 4, and the at least one reallocation indicator may include or correspond to the reallocation indicators 462 of FIG. 4. In some implementations, the DCI includes the at least one reallocation indicator that indicates reallocation of the one or more PHY layer resources and an additional indicator that indicates reallocation of one or more time and frequency resources allocated to the UE. For example, the additional indicator may include or correspond to additional indicators 472 of FIG. 4. At block 804, the base station communicates with a network entity different from the UE via the one or more PHY layer resources. For example, the network entity may include or correspond to UE 490 of FIG. 4, and the communicating may include or correspond to priority traffic 478 of FIG. 4.

In some implementations, communicating with the network entity via the one or more PHY layer resources includes spatially multiplexing URLLC traffic to the network entity via the one or more PHY layer resources with traffic to the UE via other PHY layer resources during a common time period. For example, the URLLC traffic may include or correspond to priority traffic 478 of FIG. 4, which is spatially multiplexed by base station 105 with traffic to UE 115.

In some implementations, process 800 further includes receiving, from the UE and prior to transmitting the DCI, UCI that indicates one or more released PHY layer resources by the UE. The one or more released PHY layer resources correspond to one or more TBs of multiple TBs allocated to the UE, a common message of a rate-split communication signal allocated to the UE, a private message of the rate split communication, an entirety of the rate-split communication signal, one or more PHY layers allocated to the UE, or a combination thereof. For example, the UCI may include or correspond to release message 476 of FIG. 4.

In some implementations, the DCI includes a DL pre-emption message that indicates pre-emption of DL communication to the UE via the one or more PHY layer resources for communication with the network entity via the one or more PHY layer resources. For example, reallocation message 470 of FIG. 4 may be a DL pre-emption message and reallocation indicators 462 may indicate one or more pre-empted PHY layer resources of a DL grant. In some alternate implementations, the DCI includes a ULCI message that cancels allocation of the one or more PHY layer resources to the UE for UL communications. For example, reallocation message 470 of FIG. 4 may be a ULCI message and reallocation indicators 462 may indicate one or more canceled PHY layer resources of a UL grant.

In some implementations, the at least one reallocation indicator includes a TB reallocation indicator, a rate-split message reallocation indicator, a layer reallocation indicator, or a combination thereof. For example, the TB reallocation indicator may include or correspond to TB reallocation indicator 464 of FIG. 4, the rate-split message reallocation indicator may include or correspond to rate-split message reallocation indicator 466 of FIG. 4, and the layer reallocation indicator may include or correspond to PHY layer reallocation indicator 468 of FIG. 4. In some such implementations, the at least one reallocation indicator includes the TB reallocation indicator and the one or more PHY layer resources correspond to one or more TBs of multiple TBs allocated to the UE. For example, TB reallocation indicator 464 of FIG. 4 indicates one or more TBs of multiple TBs allocated to UE 115. Additionally or alternatively, the at least one reallocation indicator includes the layer reallocation indicator and the one or more PHY layer resources correspond to one or more PHY layers allocated to the UE. For example, PHY layer reallocation indicator 468 of FIG. 4 indicates one or more PHY layers allocated to UE 115. Additionally or alternatively, the at least one reallocation indicator includes the rate-split message reallocation indicator and the one or more PHY layer resources correspond to one or more rate-split messages allocated to the UE. For example, rate-split message reallocation indicator 466 of FIG. 4 indicates one or more rate-split messages allocated to UE 115. In some such implementations, the one or more PHY layer resources are allocated to a communication signal that includes a common message and multiple private messages, and the rate-split message reallocation indicator indicates reallocation of PHY layer resources corresponding to the common message, one of the multiple private messages, all of the multiple private messages, or an entirety of the communication signal.

In some implementations, the at least one reallocation indicator indicates reallocation of multiple PHY layer resources allocated to the UE and the at least one reallocation indicator includes multiple bits having a same quantity as the multiple PHY layer resources. Each bit of the multiple bits indicates whether a corresponding PHY layer resource of the multiple PHY layer resources is reallocated. For example, the at least one reallocation indicator may include or correspond to first PHY reallocation indicator 510 of FIG. 5, and the multiple bits may include or correspond to first indicator 512, second indicator 514, and Nth indicator 516 of FIG. 5.

In some implementations, the at least one reallocation indicator includes one or more bits having a quantity less than the one or more PHY layer resources. Each bit of the one or more bits indicates whether a corresponding preconfigured PHY layer resource of the one or more PHY layer resources is reallocated. For example, the at least one reallocation indicator may include or correspond to second PHY reallocation indicator 520 of FIG. 5, and the one or more bits may include or correspond to one or more of first indicator 522, second indicator 524, and Mth indicator 526. In some such implementations, process 800 further includes transmitting a RRC message to the UE. The RRC identifies one or more preconfigured PHY layer resources and corresponding bits of the at least one reallocation indicators. For example, the RRC message may include or correspond to configuration message 474 of FIG. 4.

In some implementations, the at least one reallocation indicator includes a time and frequency resources reallocation indicator having a preset value associated with an invalid reallocation of time and frequency resources. For example, the at least one reallocation indicator may include or correspond to third PHY reallocation indicator 530 of FIG. 5, and the preset value may include or correspond to invalid time/freq indicator 532 of FIG. 5.

FIG. 9 is a block diagram of an example base station 900 that supports reallocation of PHY layer resources allocated for wireless communication according to one or more aspects. Base station 900 may be configured to perform operations, including the blocks of process 800 described with reference to FIG. 8. In some implementations, base station 900 includes the structure, hardware, and components shown and described with reference to base station 105 of FIGS. 1-4. For example, base station 900 may include controller 240, which operates to execute logic or computer instructions stored in memory 242, as well as controlling the components of base station 900 that provide the features and functionality of base station 900. Base station 900, under control of controller 240, transmits and receives signals via wireless radios 901*a-t* and antennas 934*a-t*. Wireless radios 901*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include reallocation indicators 902 (e.g., at least one reallocation indicator) and communication logic 903. Reallocation indicators 902 may be included in reallocation message(s) transmitted by base station 900 and indicate one or more PHY layer resources that are reallocated. For example, reallocation indicators 902 may include or correspond to reallocation indicators 462 of FIG. 4. Communication logic 903 may be configured to enable communication between base station 900 and one or more other devices. Base station 900 may receive signals from or transmit signals to one or more UEs, such as UE 115 of FIGS. 1-4 or UE 700 of FIG. 7.

It is noted that one or more blocks (or operations) described with reference to FIG. 6 or 8 may be combined with one or more blocks (or operations) described with reference to another of the figures. For example, one or more blocks (or operations) of FIG. 6 may be combined with one or more blocks (or operations) of FIG. 8. As another example, one or more blocks associated with FIG. 8 may be combined with one or more blocks associated with FIG. 6. As another example, one or more blocks associated with FIG. 6 or 8 may be combined with one or more blocks (or operations) associated with FIGS. 1-4. Additionally, or alternatively, one or more operations described above with reference to FIGS. 1-4 may be combined with one or more operations described with reference to FIG. 7 or 9.

In one or more aspects, techniques for supporting reallocation of PHY layer resources allocated for wireless communication may include additional aspects, such as any single aspect or any combination of aspects described below or in connection with one or more other processes or devices described elsewhere herein. In a first aspect, techniques for supporting reallocation of PHY layer resources allocated for wireless communication may include receiving, from a network, DCI for reallocating one or more resources allocated to communications for the UE. The DCI includes at least one reallocation indicator that indicates reallocation of one or more PHY layer resources allocated to the UE. The techniques may further include performing a responsive action based on the at least one reallocation indicator. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem, or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform the operations described herein.

In a second aspect, in combination with the first aspect, the at least one reallocation indicator includes a TB reallocation indicator, a rate-split message reallocation indicator, a layer reallocation indicator, or a combination thereof.

In a third aspect, in combination with the second aspect, the at least one reallocation indicator includes the TB reallocation indicator, and the one or more PHY layer resources correspond to one or more TBs of multiple TBs allocated to the UE.

In a fourth aspect, in combination with the second aspect or the third aspect, the at least one reallocation indicator includes the rate-split message reallocation indicator, and the one or more PHY layer resources correspond to one or more rate-split messages allocated to the UE.

In a fifth aspect, in combination with the fourth aspect, the one or more PHY layer resources are allocated to a communication signal that includes a common message and multiple private messages. The rate-split message reallocation indicator indicates reallocation of PHY layer resources corresponding to the common message, one of the multiple private messages, all of the multiple private messages, or an entirety of the communication signal.

In a sixth aspect, in combination with one or more of the second aspect through the fifth aspect, the at least one reallocation indicator includes the layer reallocation indicator, and the one or more PHY layer resources correspond to one or more PHY layers allocated to the UE.

In a seventh aspect, in combination with one or more of the first aspect through the sixth aspect, the at least one reallocation indicator indicates reallocation of multiple PHY layer resources allocated to the UE. The at least one reallocation indicator includes multiple bits having a same quantity as the multiple PHY layer resources. Each bit of the multiple bits indicates whether a corresponding PHY layer resource of the multiple PHY layer resources is reallocated.

In an eighth aspect, in combination with one or more of the first aspect through the seventh aspect, the at least one reallocation indicator includes one or more bits having a quantity less than the one or more PHY layer resources. Each bit of the one or more bits indicates whether a corresponding preconfigured PHY layer resource of the one or more PHY layer resources is reallocated.

In a ninth aspect, in combination with the eighth aspect, the techniques further include receiving a RRC message from the network. The RRC identifies one or more preconfigured PHY layer resources and corresponding bits of the at least one reallocation indicators.

In a tenth aspect, in combination with one or more of the first aspect through the ninth aspect, the at least one reallocation indicator includes a time and frequency resources reallocation indicator having a preset value associated with an invalid reallocation of time and frequency resources.

In an eleventh aspect, in combination with one or more of the first aspect through the tenth aspect, the DCI includes a DL pre-emption message, and the responsive action includes clearing a buffer of data received via the one or more PHY layer resources during a corresponding DL grant.

In a twelfth aspect, in combination with one or more of the first aspect through the eleventh aspect, the DCI includes a ULCI message, and the responsive action includes refraining from communicating with the network via the one or more PHY layer resources during a corresponding uplink grant.

In a thirteenth aspect, in combination with one or more of the first aspect through the twelfth aspect, the at least one reallocation indicator includes a layer reallocation indicator that indicates reallocation of one or more PHY layers, and the responsive action includes recalculating a transport block size for communication with the network via remaining allocated PHY layers.

In a fourteenth aspect, in combination with one or more of the first aspect through the thirteenth aspect, the DCI includes the at least one reallocation indicator that indicates reallocation of the one or more PHY layer resources and an additional indicator that indicates reallocation of one or more time and frequency resources allocated to the UE.

In one or more aspects, techniques for supporting reallocation of PHY layer resources allocated for wireless communication may include additional aspects, such as any single aspect or any combination of aspects described below or in connection with one or more other processes or devices described elsewhere herein. In a fifteenth aspect, techniques for supporting reallocation of PHY layer resources allocated for wireless communication may include transmitting DCI for reallocating one or more resources allocated to communications for a UE. The DCI includes at least one reallocation indicator that indicates reallocation of one or more PHY layer resources allocated to the UE. The techniques may further include communicating with a network entity different from the UE via the one or more PHY layer resources. In some examples, the techniques in the fifteenth aspect may be implemented in a method or process. In some other examples, the techniques of the fifteenth aspect may be implemented in a wireless communication device, such as network entity, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform the operations described herein.

In a sixteenth aspect, in combination with the fifteenth aspect, the at least one reallocation indicator includes a TB reallocation indicator, a rate-split message reallocation indicator, a layer reallocation indicator, or a combination thereof.

In a seventeenth aspect, in combination with the sixteenth aspect, the at least one reallocation indicator includes the TB reallocation indicator, and the one or more PHY layer resources correspond to one or more TBs of multiple TBs allocated to the UE.

In an eighteenth aspect, in combination with the sixteenth aspect or the seventeenth aspect, the at least one reallocation indicator includes the rate-split message reallocation indicator, and the one or more PHY layer resources correspond to one or more rate-split messages allocated to the UE.

In a nineteenth aspect, in combination with the eighteenth aspect, the one or more PHY layer resources are allocated to a communication signal that includes a common message and multiple private messages. The rate-split message reallocation indicator indicates reallocation of PHY layer resources corresponding to the common message, one of the multiple private messages, all of the multiple private messages, or an entirety of the communication signal.

In a twentieth aspect, in combination with one or more of the sixteenth aspect through the nineteenth aspect, the at least one reallocation indicator includes the layer reallocation indicator, and the one or more PHY layer resources correspond to one or more PHY layers allocated to the UE.

In a twenty-first aspect, in combination with one or more of the fifteenth aspect through the twentieth aspect, the at least one reallocation indicator indicates reallocation of multiple PHY layer resources allocated to the UE, and the at least one reallocation indicator includes multiple bits having a same quantity as the multiple PHY layer resources. Each bit of the multiple bits indicates whether a corresponding PHY layer resource of the multiple PHY layer resources is reallocated.

In a twenty-second aspect, in combination with one or more of the fifteenth aspect through the twenty-first aspect, the at least one reallocation indicator includes one or more bits having a quantity less than the one or more PHY layer resources. Each bit of the one or more bits indicates whether a corresponding preconfigured PHY layer resource of the one or more PHY layer resources is reallocated.

In a twenty-third aspect, in combination with the twenty-second aspect, the techniques include transmitting a RRC message that identifies one or more preconfigured PHY layer resources and corresponding bits of the at least one reallocation indicators.

In a twenty-fourth aspect, in combination with one or more of the fifteenth aspect through the twenty-third aspect, the at least one reallocation indicator includes a time and frequency resources reallocation indicator having a preset value associated with an invalid reallocation of time and frequency resources.

In a twenty-fifth aspect, in combination with one or more of the fifteenth aspect through the twenty-fourth aspect, communicating with the network entity via the one or more PHY layer resources includes spatially multiplexing URLLC traffic to the network entity via the one or more PHY layer resources with traffic to the UE via other PHY layer resources during a common time period.

In a twenty-sixth aspect, in combination with one or more of the fifteenth aspect through the twenty-fifth aspect, the techniques include receiving, from the UE and prior to transmitting the DCI, UCI that indicates one or more released PHY layer resources by the UE. The one or more released PHY layer resources correspond to one or more TBs of multiple TBs allocated to the UE, a common message of a rate-split communication signal allocated to the UE, a private message of the rate split communication, an entirety of the rate-split communication signal, one or more PHY layers allocated to the UE, or a combination thereof.

In a twenty-seventh aspect, in combination with one or more of the fifteenth aspect through the twenty-sixth aspect, the DCI includes a DL pre-emption message that indicates pre-emption of DL communication to the UE via the one or more PHY layer resources for communication with the network entity via the one or more PHY layer resources.

In a twenty-eighth aspect, in combination with one or more of the fifteenth aspect through the twenty-seventh aspect, the DCI includes a ULCI message that cancels allocation of the one or more PHY layer resources to the UE for UL communications.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
a memory storing processor-readable code; and
at least one processor coupled to the memory, the at least one processor configured to execute the processor-readable code to cause the at least one processor to:
receive, from a network, downlink control information (DCI) for reallocating one or more resources allocated to communications for the UE, the DCI including at least one reallocation indicator that indicates reallocation of one or more physical (PHY) layer resources allocated to the UE; and
perform a responsive action based on the at least one reallocation indicator.

2. The UE of claim 1, wherein the at least one reallocation indicator includes a transport block (TB) reallocation indicator, a rate-split message reallocation indicator, a layer reallocation indicator, or a combination thereof.

3. The UE of claim 2, wherein the at least one reallocation indicator includes the TB reallocation indicator, and wherein the one or more PHY layer resources correspond to one or more TBs of multiple TBs allocated to the UE.

4. The UE of claim 2, wherein the at least one reallocation indicator includes the rate-split message reallocation indicator, and wherein the one or more PHY layer resources correspond to one or more rate-split messages allocated to the UE.

5. The UE of claim 4, wherein the one or more PHY layer resources are allocated to a communication signal comprising a common message and multiple private messages, and wherein the rate-split message reallocation indicator indicates reallocation of PHY layer resources corresponding to the common message, one of the multiple private messages, all of the multiple private messages, or an entirety of the communication signal.

6. The UE of claim 2, wherein the at least one reallocation indicator includes the layer reallocation indicator, and wherein the one or more PHY layer resources correspond to one or more PHY layers allocated to the UE.

7. The UE of claim 1, wherein the at least one reallocation indicator indicates reallocation of multiple PHY layer resources allocated to the UE, and wherein the at least one reallocation indicator comprises multiple bits having a same quantity as the multiple PHY layer resources, each bit of the multiple bits indicating whether a corresponding PHY layer resource of the multiple PHY layer resources is reallocated.

8. The UE of claim 1, wherein the at least one reallocation indicator comprises one or more bits having a quantity less than the one or more PHY layer resources, each bit of the one or more bits indicating whether a corresponding preconfigured PHY layer resource of the one or more PHY layer resources is reallocated.

9. The UE of claim 8, wherein the at least one processor is configured to execute the processor-readable code to cause the at least one processor to receive a radio resource control (RRC) message from the network, the RRC identifying one or more preconfigured PHY layer resources and corresponding bits of the at least one reallocation indicators.

10. The UE of claim 1, wherein the at least one reallocation indicator comprises a time and frequency resources reallocation indicator having a preset value associated with an invalid reallocation of time and frequency resources.

11. A method of wireless communication performed by a user equipment (UE), the method comprising:
receiving, from a network, downlink control information (DCI) for reallocating one or more resources allocated to communications for the UE, the DCI including at least one reallocation indicator that indicates reallocation of one or more physical (PHY) layer resources allocated to the UE; and
performing a responsive action based on the at least one reallocation indicator.

12. The method of claim 11, wherein the DCI comprises a downlink (DL) pre-emption message, and wherein the responsive action comprises clearing a buffer of data received via the one or more PHY layer resources during a corresponding DL grant.

13. The method of claim 11, wherein the DCI comprises an uplink (UL) cancellation indication (ULCI) message, and wherein the responsive action comprises refraining from communicating with the network via the one or more PHY layer resources during a corresponding uplink grant.

14. The method of claim 11, wherein the at least one reallocation indicator includes a layer reallocation indicator that indicates reallocation of one or more PHY layers, and wherein the responsive action comprises recalculating a transport block size for communication with the network via remaining allocated PHY layers.

15. The method of claim 11, wherein the DCI includes the at least one reallocation indicator that indicates reallocation of the one or more PHY layer resources and an additional indicator that indicates reallocation of one or more time and frequency resources allocated to the UE.

16. A base station comprising:
a memory storing processor-readable code; and
at least one processor coupled to the memory, the at least one processor configured to execute the processor-readable code to cause the at least one processor to:
initiate transmission of downlink control information (DCI) for reallocating one or more resources allocated to communications for a user equipment (UE), the DCI including at least one reallocation indicator that indicates reallocation of one or more physical (PHY) layer resources allocated to the UE; and
communicate with a network entity that is different from the UE via the one or more PHY layer resources.

17. The base station of claim 16, wherein the at least one reallocation indicator includes a transport block (TB) reallocation indicator, a rate-split message reallocation indicator, a layer reallocation indicator, or a combination thereof.

18. The base station of claim 17, wherein the at least one reallocation indicator includes the TB reallocation indicator, and wherein the one or more PHY layer resources correspond to one or more TBs of multiple TBs allocated to the UE.

19. The base station of claim 17, wherein the at least one reallocation indicator includes the rate-split message reallocation indicator, and wherein the one or more PHY layer resources correspond to one or more rate-split messages allocated to the UE.

20. The base station of claim 19, wherein the one or more PHY layer resources are allocated to a communication signal comprising a common message and multiple private messages, and wherein the rate-split message reallocation indicator indicates reallocation of PHY layer resources corresponding to the common message, one of the multiple private messages, all of the multiple private messages, or an entirety of the communication signal.

21. The base station of claim 17, wherein the at least one reallocation indicator includes the layer reallocation indicator, and wherein the one or more PHY layer resources correspond to one or more PHY layers allocated to the UE.

22. The base station of claim 16, wherein the at least one reallocation indicator indicates reallocation of multiple PHY layer resources allocated to the UE, and wherein the at least one reallocation indicator comprises multiple bits having a same quantity as the multiple PHY layer resources, each bit of the multiple bits indicating whether a corresponding PHY layer resource of the multiple PHY layer resources is reallocated.

23. The base station of claim 16, wherein the at least one reallocation indicator comprises one or more bits having a quantity less than the one or more PHY layer resources, each bit of the one or more bits indicating whether a corresponding preconfigured PHY layer resource of the one or more PHY layer resources is reallocated.

24. The base station of claim 23, wherein the at least one processor is configured to execute the processor-readable code to cause the at least one processor to initiate transmission of a radio resource control (RRC) message that identifies one or more preconfigured PHY layer resources and corresponding bits of the at least one reallocation indicators.

25. The base station of claim 16, wherein the at least one reallocation indicator comprises a time and frequency resources reallocation indicator having a preset value associated with an invalid reallocation of time and frequency resources.

26. A method of wireless communication performed by a base station, the method comprising:
transmitting downlink control information (DCI) for reallocating one or more resources allocated to communications for a user equipment (UE), the DCI including at least one reallocation indicator that indicates reallocation of one or more physical (PHY) layer resources allocated to the UE; and
communicating with a network entity different from the UE via the one or more PHY layer resources.

27. The method of claim 26, wherein communicating with the network entity via the one or more PHY layer resources comprises spatially multiplexing ultra-reliable low latency communication (URLLC) traffic to the network entity via the one or more PHY layer resources with traffic to the UE via other PHY layer resources during a common time period.

28. The method of claim 26, further comprising receiving, from the UE and prior to transmitting the DCI, uplink control information (UCI) that indicates one or more released PHY layer resources by the UE, the one or more released PHY layer resources corresponding to one or more transport blocks (TBs) of multiple TBs allocated to the UE, a common message of a rate-split communication signal allocated to the UE, a private message of the rate split communication, an entirety of the rate-split communication signal, one or more PHY layers allocated to the UE, or a combination thereof.

29. The method of claim 26, wherein the DCI comprises a downlink (DL) pre-emption message that indicates pre-emption of DL communication to the UE via the one or more PHY layer resources for communication with the network entity via the one or more PHY layer resources.

30. The method of claim 26, wherein the DCI comprises an uplink (UL) cancellation indication (ULCI) message that cancels allocation of the one or more PHY layer resources to the UE for UL communications.

* * * * *